United States Patent
Haga et al.

(10) Patent No.: US 11,880,527 B2
(45) Date of Patent: *Jan. 23, 2024

(54) DEVICE TO ENABLE TOUCHLESS OPERATION

(71) Applicant: SHANGHAI TIANMA MICRO-ELECTRONICS CO., LTD., Shanghai (CN)

(72) Inventors: Hiroshi Haga, Kanagawa (JP); Koji Shigemura, Kanagawa (JP); Hirotsugu Yamamoto, Utsunomiya (JP)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,320

(22) Filed: Dec. 8, 2022

(65) Prior Publication Data

US 2023/0108595 A1 Apr. 6, 2023

Related U.S. Application Data

(63) Continuation of application No. 17/737,410, filed on May 5, 2022, now Pat. No. 11,550,423.

(30) Foreign Application Priority Data

May 7, 2021 (JP) .................................. 2021-079203

(51) Int. Cl.
*G06F 3/041* (2006.01)
*G06F 3/044* (2006.01)
*G06F 3/01* (2006.01)

(52) U.S. Cl.
CPC .......... *G06F 3/04164* (2019.05); *G06F 3/016* (2013.01); *G06F 2203/04108* (2013.01)

(58) Field of Classification Search
None
See application file for complete search history.

(56) References Cited

U.S. PATENT DOCUMENTS

| 5,396,443 | A | 3/1995 | Mese et al. |
| 10,664,056 | B2 | 5/2020 | Matsumoto |
| 2009/0058829 | A1 | 3/2009 | Kim et al. |

(Continued)

FOREIGN PATENT DOCUMENTS

JP 2017-072901 A 4/2017

OTHER PUBLICATIONS

U.S. Appl. No. 17/737,410, filed May 5, 2022.

*Primary Examiner* — Krishna P Neupane
(74) *Attorney, Agent, or Firm* — NIXON & VANDERHYE (57) ABSTRACT

A device to enable touchless operation of an instrument is disclosed. The device includes an actuator configured to vibrate the instrument, a controller configured to control the actuator, and an interval detector configured to detect an interval between the instrument and an object to operate the instrument. The controller is configured to start vibrating the actuator having been still after the interval detected by the interval detector reaches a first threshold, keep vibrating the actuator until the interval detected by the interval detector reaches a second threshold larger than the first threshold after the interval reaches the first threshold, and stop vibrating the actuator after the interval detected by the interval detector reaches the second threshold.

11 Claims, 9 Drawing Sheets

(56) References Cited

U.S. PATENT DOCUMENTS

2015/0116280 A1    4/2015   Moon et al.
2015/0378436 A1   12/2015   Uchikawa et al.
2019/0339776 A1   11/2019   Rosenberg et al.

DEVICE TO ENABLE TOUCHLESS OPERATION

CROSS-REFERENCE TO RELATED APPLICATIONS

This application is a Continuation of application Ser. No. 17/737,410, filed on May 5, 2022, which claims priority under 35 U.S.C. § 119(a) to Application No. 2021-079203, filed in Japan on May 7, 2021, all of which are hereby expressly incorporated by reference into the present application.

BACKGROUND OF THE INVENTION

Field of the Invention

This disclosure relates to a technology to enable touchless operation of an instrument.

Description of the Related Art

To prevent fingerprints from sticking or contagious diseases from spreading, there are known input devices that accept inputs without being touched on their touch surfaces. An example of such an input device measures the electrostatic capacitance between a finger and a touch panel to detect the finger located a several centimeters away from the touch panel.

As another technology, JP 2017-072901 A discloses a tactile sense presentation device for presenting an operational sense of a push operation by controlling a floating force given by a squeeze film to an operating finger. The technique according to JP 2017-072901 A stops the vibration of the touch surface to allow the finger to touch the touch surface when the interval between the finger and the touch surface decreases to less than a predetermined value. Such control of the floating force caused by the squeeze film provides the user with a natural operational sense of a push operation.

SUMMARY OF THE INVENTION

An aspect of this disclosure is a device to enable touchless operation of an instrument, the device including: an actuator configured to vibrate the instrument; a controller configured to control the actuator; and an interval detector configured to detect an interval between the instrument and an object to operate the instrument. The controller is configured to: start vibrating the actuator having been still after the interval detected by the interval detector reaches a first threshold; keep vibrating the actuator until the interval detected by the interval detector reaches a second threshold larger than the first threshold after the interval reaches the first threshold; and stop vibrating the actuator after the interval detected by the interval detector reaches the second threshold.

An aspect of this disclosure is a device to enable touchless operation of an instrument, the device including: an actuator configured to vibrate the instrument a controller configured to control the actuator; and an interval detector configured to detect an interval between the instrument and an object to operate the instrument. The controller is configured to: start vibrating the actuator having been still after the interval detected by the interval detector reaches a first threshold; keep vibrating the actuator until a time elapsed since a last operation to the instrument reaches a time threshold; and stop vibrating the actuator after the elapsed time reaches the time threshold.

It is to be understood that both the foregoing general description and the following detailed description are exemplary and explanatory and are not restrictive of this disclosure.

DESCRIPTION OF THE PREFERRED EMBODIMENTS

Hereinafter, embodiments of this disclosure will be described with reference to the accompanying drawings. It should be noted that the embodiments are merely examples to implement this disclosure and are not to limit the technical scope of this disclosure. Some elements in the drawings may be exaggerated in size or shape for clear understanding of the description.

Overview

The device in an embodiment of this specification disclosed herein enables a user to operate an instrument without touching it directly. The device vibrates the instrument at high frequency to generate a squeeze film between the instrument and the object to operate the instrument. The squeeze film enables the user to operate the instrument without touching it directly. Hence, spread of contagious diseases or sticking of a fingerprint to the instrument can be prevented. Examples of the instrument to be operated include a touch sensor, a button of an elevator or an automatic door, and a doorknob. A typical example of the object to operate the instrument is a human part such as a finger or a hand.

As described above, the device in an embodiment of this specification vibrates the instrument at high frequency. For this reason, lower power consumption of the device and a smaller possibility of failure in the device and the instrument are demanded. The device detects that an object to operate the instrument, such as a finger, approaches a touch surface of the instrument and vibrates the touch surface at high frequency before the finger touches the touch surface to enable the user to operate the instrument without touching the touch surface with the finger. The high-frequency vibration can be continued during the time the finger is close to the touch surface or until a predetermined time elapses since the last operation.

An embodiment of this specification measures the interval between the instrument and the object to operate the instrument and controls vibration based on the measured interval. For example, the device starts vibrating the instrument when the interval between the instrument and the object to operate the instrument is reduced to a first threshold. The device stops the vibration when the interval once having reached the first threshold is increased to a second threshold larger than the first threshold. The vibration is kept until being stopped. In this way, the vibration is started after the measured interval reaches the first threshold and stopped after the measured interval subsequently reaches the larger second threshold. This control enables touchless operation while attaining low power consumption and a small possibility of failure.

Another embodiment of this specification controls the vibration based on the time elapsed since the last operation to the instrument. For example, the device starts vibrating the instrument when the interval between the instrument and the object to operate the instrument is reduced to a threshold and stops the vibration when the time elapsed since the last operation reaches a threshold. In this way, the vibration is stopped after the time elapsed since the last operation reaches a time threshold. This control enables touchless operation while attaining low power consumption and a small possibility of failure. The device can use either one or both of the second threshold for the interval and the threshold for the elapsed time. In using both thresholds, either AND conditions or OR condition can be employed.

As described above, an embodiment of this specification generates a squeeze film between the instrument and the object to operate the instrument to enable touchless operation of the instrument. In the following, the squeeze film is explained.

It is known that a flat plate levitates when it is placed on a surface vibrating at high frequency. This phenomenon is explained by squeeze film pressure or acoustic radiation pressure. The pressure (levitation pressure) W/S the floating plate receives is expressed by the following formula in accordance with the theory of acoustic radiation pressure:

$$W/S = (1/4)(\rho c^2)(\zeta^2/h^2),$$

where W represents the weight [N], S represents the area of the plate [$m^2$],
$\rho$ represents the density of air [$kg/m^3$], c represents the speed of sound in air [m/s], $\zeta$ represents the amplitude of vibration of the surface [$m_{0-P}$], and h represents the height of levitation [m].

Consider an example where the amplitude of vibration $\zeta$ of a surface is 5 um, the height of levitation h is 5 um, and the levitation pressure is 35.6 kPa. Assuming that the area of a fingertip is 1 $cm^2$, a force of 363 gf acts on the finger as resistance to interfere with the finger in touching the surface.

Device Configuration

Figure 1:
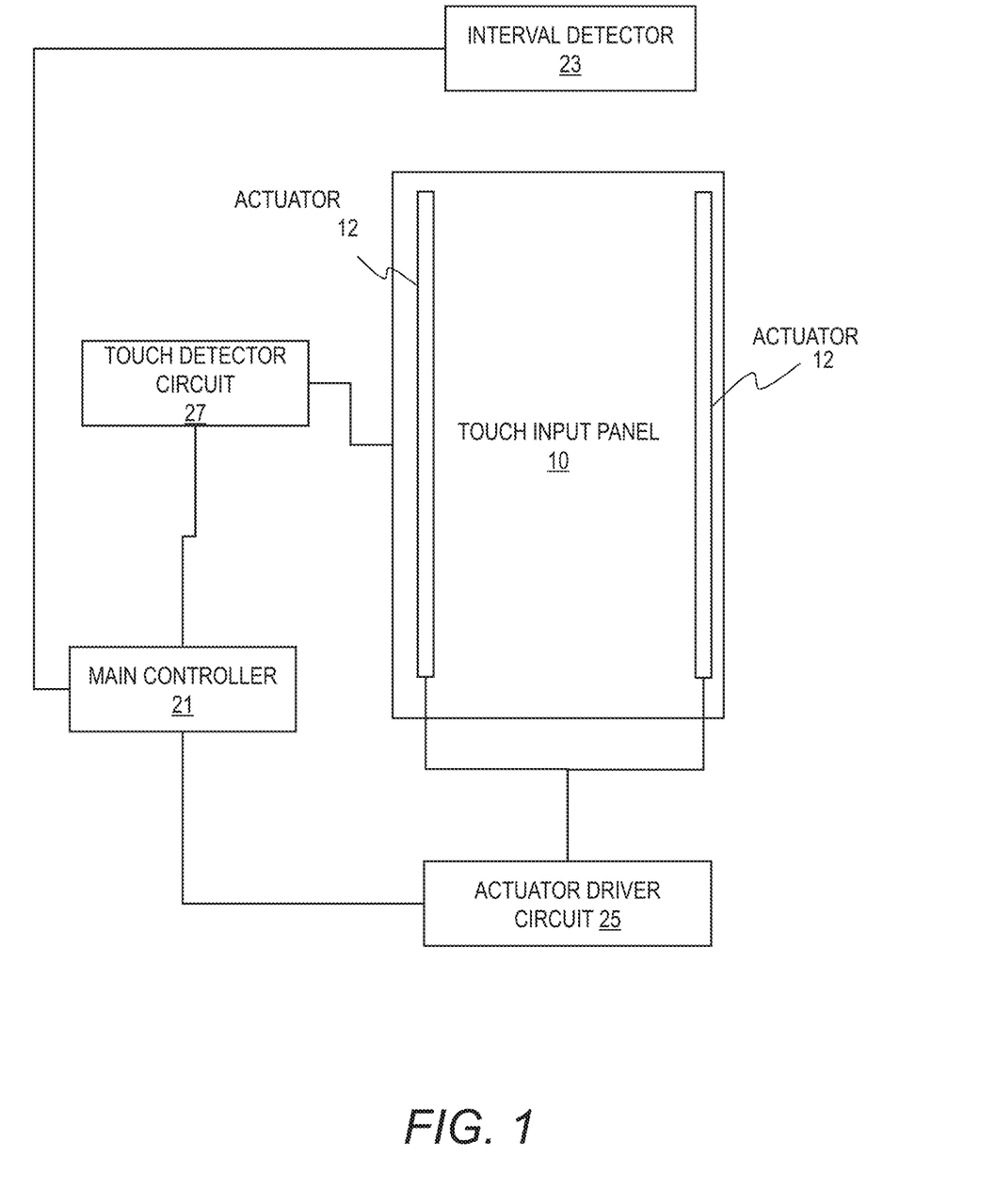
FIG. 1 schematically illustrates a configuration example of an input device in an embodiment of this specification.

Hereinafter, embodiments of this specification are described using a touch input panel as an example of the instrument to be operated and a finger as an object to operate the touch panel. FIG. 1 schematically illustrates a configuration example of an input device in an embodiment of this specification. The input device includes a touch input panel 10, actuators 12, a main controller 21, an interval detector 23, an actuator driver circuit 25, and a touch detector circuit 27. The main controller 21, the interval detector 23, the actuator driver circuit 25, and the touch detector circuit 27 are included in a controller of the input device.

The actuators 12 vibrate the touch input panel 10 in the direction normal to the touch surface (principal surface). In the configuration example of FIG. 1, the actuators 12 are disposed on the left and the right of the touch input panel 10 on the front or the back of the touch input panel 10. The side of the touch input panel 10 to be touched by the user is defined as front and the opposite side as back. The actuators 12 can be fabricated directly on the substrate of the touch input panel 10 by semiconductor process or they can be fabricated separately from the substrate and bonded to the substrate.

The touch input panel can be vibrated in the direction normal to the touch surface by using the elongation vibration mode or the thickness vibration mode of a planar piezoelectric member bonded to the touch input panel. The number and the shapes of actuators 12 and the locations to dispose the actuators 12 can be determined by design so that the touch input panel 10 will vibrate in a predetermined vibration mode.

The actuator driver circuit 25 drives the actuators 12. The actuators 12 can be made of desirable kinds of material and can have a desirable structure. For example, the actuators 12 can be thin-film actuators fabricated on a substrate and they can be of any kind of actuators, such as piezoelectric actuators, macro-fiber composite actuators, smart material actuators, or electronic polymer actuators. The plurality of actuators 12 can be made of the same or different material and can have the same or different structures.

The actuator driver circuit 25 can vibrate the actuators 12 at a desirable vibration frequency by supplying the actuators 12 with a driving signal (driving voltage) at a specific frequency. The touch input panel 10 vibrates with the vibration of the actuators 12 to generate a squeeze film.

The touch input panel 10 utilizes pressure or capacitance to output a signal indicating a location (touch point or operation point) on the touch surface touched by a finger directly or through a squeeze film to the touch detector circuit 27. The touch input panel 10 can employ any input method in accordance with the design. The touch detector circuit 27 drives the touch detector electrodes of the touch input panel 10 and detects the user's operation point on the touch surface based on the touch detection signal from the touch input panel 10.

The interval detector 23 detects a finger close to the touch surface of the touch input panel 10 and measures the interval between the finger and the touch surface. The interval detector 23 can employ any kind of existing technology, such as a hover detection function of a capacitance touch panel, a visible-light camera, an infrared camera, a pyroelectric sensor, or an ultrasonic sensor.

For example, the interval detector 23 measures the interval by taking an image of light illuminating the finger with a camera. The interval detector 23 can measure the interval by emitting a random dot pattern from an infrared projector and reading the variation after the dot pattern hits the finger with an infrared camera. Alternatively, the interval detector 23 can measure the interval by analyzing the time taken by emitted infrared rays to hit the finger and return. The interval detector 23 can also measure the interval by taking images of the reflection of the light hitting the finger with a plurality of cameras and analyzing the images from the cameras.

In another configuration example, the interval detector 23 measures the interval between the finger and the touch surface based on the electrostatic capacitances between electrodes included in the touch panel. The interval detector 23 is incorporated in the touch detector circuit 27. For example, the touch input panel 10 includes a plurality of transmitter electrodes, a plurality of receiver electrodes, and four peripheral electrodes. To detect an approaching finger, the touch detector circuit 27 emits electric fields from all transmitter electrodes and opens all receiver electrodes. The touch detector circuit 27 serially senses the received signals with the four peripheral electrodes. The touch detector circuit 27 determines the interval to the finger and the orientation of the finger based on the level values of the received signals.

In still another configuration example, the interval detector 23 uses a pyroelectric sensor. The pyroelectric sensor outputs a pulse signal when the temperature therearound varies. That is to say, the pyroelectric sensor outputs a pulse signal when a human body enters an area within a predetermined distance or a human body moves within such an area. In response to the first response signal from the pyroelectric sensor, the main controller 21 drives the actuators 12 by controlling the actuator driver circuit 25. The main controller 21 maintains the vibration of the actuators 12 until no responding period of the pyroelectric sensor reaches a predetermined length (for example, 20 seconds).

The main controller 21 controls the interval detector 23, the actuator driver circuit 25, and the touch detector circuit 27. The main controller 21 controls the actuator driver circuit 25 to generate a squeeze film depending on the interval between a finger and the touch surface measured by the interval detector 23. The main controller 21 further sends the locational information detected by the touch input panel 10 to an external host apparatus. The details of the method for the main controller 21 to control the actuators 12 will be described later.

Figure 2:
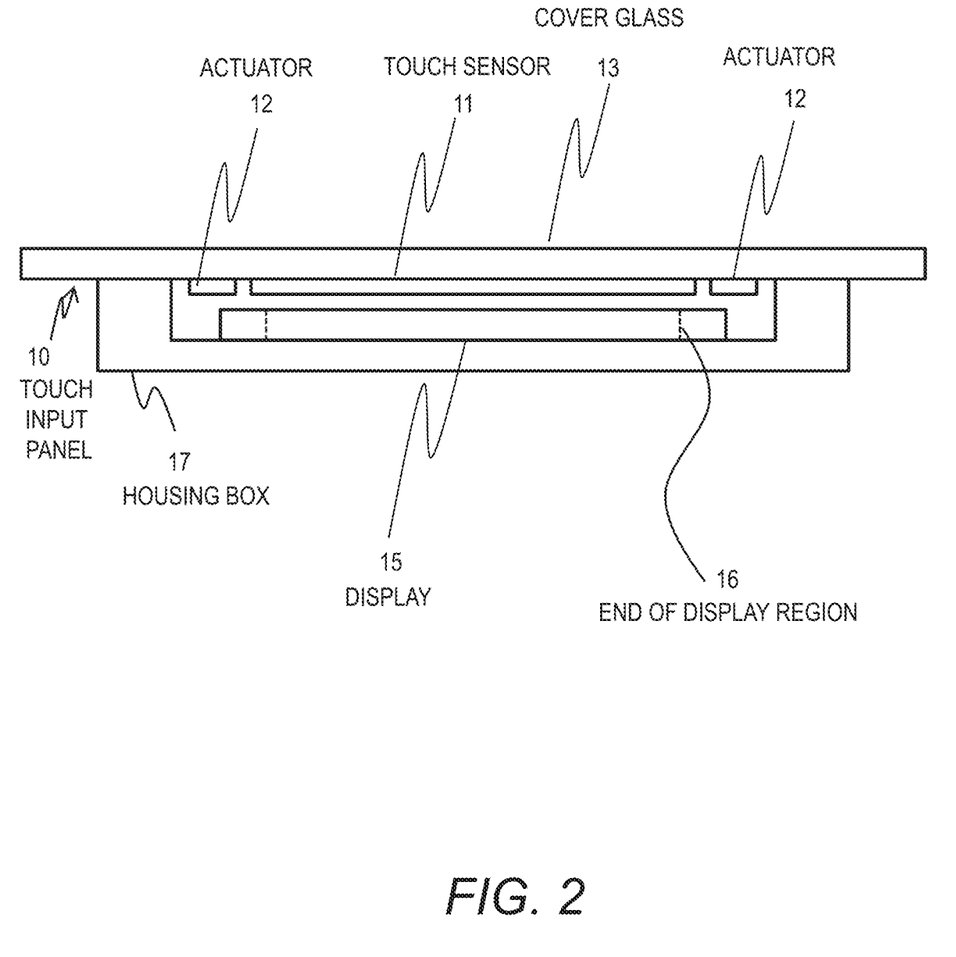
FIG. 2 is a cross-sectional diagram illustrating a configuration example of an input device in an embodiment of this specification.

FIG. 2 is a cross-sectional diagram illustrating a configuration example of an input device in an embodiment of this specification. A housing box 17 is fixed to a cover glass 13 and a display 15 is placed in the housing box 17. A touch sensor 11 is disposed between the cover glass 13 and the display 15. The touch sensor 11 is bonded on the backside of the cover glass 13. For example, photoelastic resin can be used to bond the touch sensor 11 and the cover glass 13.

In this example, the touch sensor 11 and the cover glass 13 constitute a touch input panel 10. As described with reference to FIG. 1, the touch sensor 11 detects a touch of a pointer such as a finger and locates the coordinates of the touch. The touch sensor 11 can further have functions to detect an approaching pointer and measure the interval to the pointer. The interval measurement can be performed by the interval detector 23 not shown in FIG. 2.

The front side of the cover glass 13 is a touch surface. The actuators 12 are fixed to the backside of the cover glass 13. The actuators 12 in the configuration example of FIG. 2 are located outer than the touch sensor 11 on the backside of the cover glass 13. The actuators 12 can be disposed on the surface of the touch sensor 11.

The actuator driver circuit 25 not shown in FIG. 2 supplies a voltage signal at a specific frequency to the actuators 12 to vibrate the cover glass 13. The actuators 12 can be disposed at locations off the nodes of displacement in the vibration of the cover glass 13. In other words, the actuators 12 can be disposed so that the actuators 12 are not on the nodes. As a result, the cover glass 13 can be vibrated effectively by the vibration of the actuators 12.

In contrast, the cover glass 13 can be bonded with the housing box 17 in the area including the locations to be the nodes of displacement of the cover glass 13. This configuration enables the cover glass 13 to vibrate more appropriately. The nodes of displacement of the touch surface are the locations to show zero amplitude in the vibration mode of the touch surface.

A space is provided between the cover glass 13 and the display 15 to vibrate the cover glass 13 efficiently. The space between the cover glass 13 and the display 15 can be filled with photoelastic resin.

Vibration Control

Hereinafter, vibration control for the actuators 12 is described. The main controller 21 controls vibration of the actuators 12 with the actuator driver circuit 25 based on the interval measured by the interval detector 23.

Figure 3:
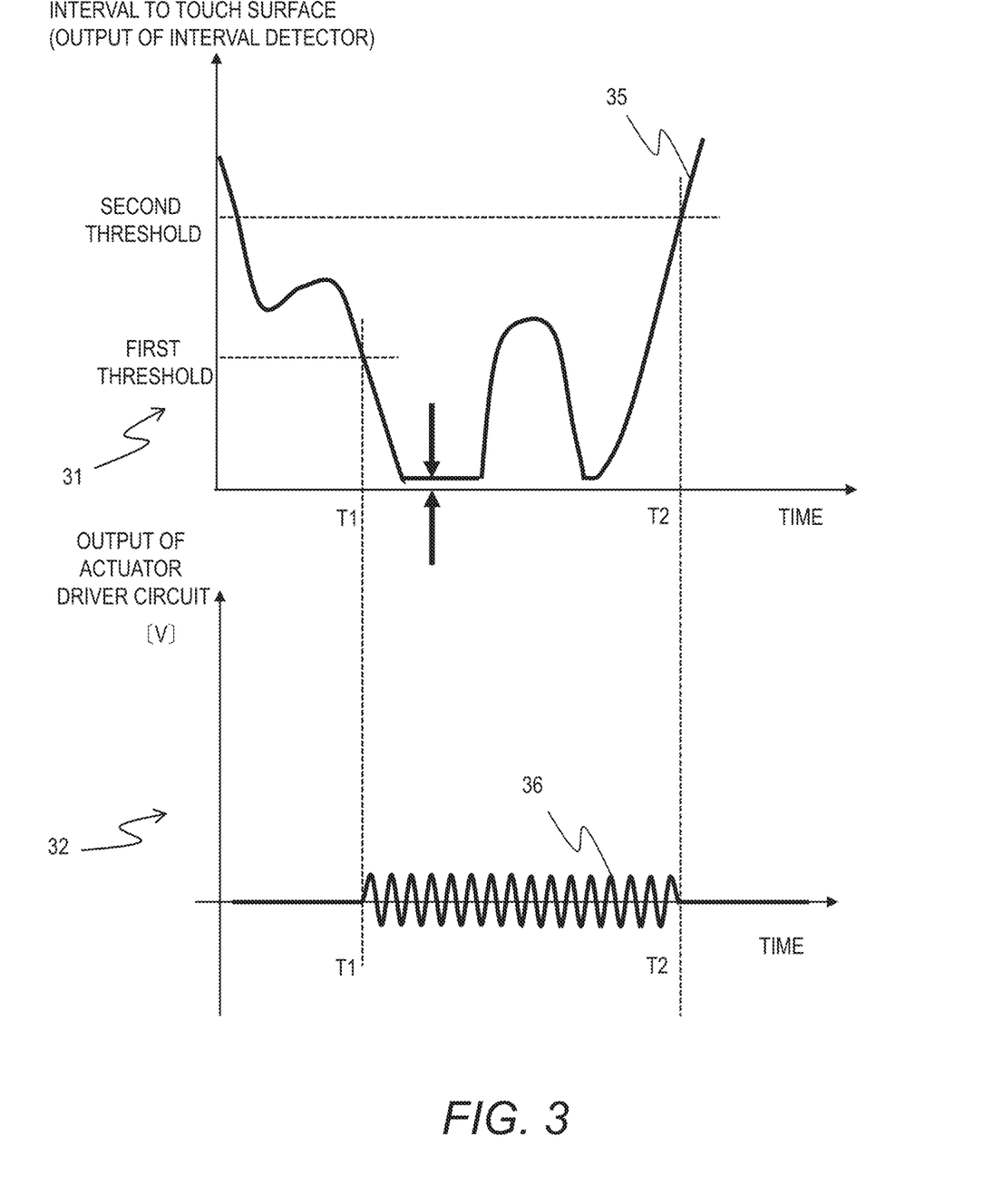
FIG. 3 schematically illustrates temporal variation of the interval between a finger and a touch surface measured by an interval detector and temporal variation of the driving signal from an actuator driver circuit to actuators.

FIG. 3 schematically illustrates temporal variation of the interval between a finger and the touch surface measured by the interval detector 23 and temporal variation of the driving signal from the actuator driver circuit 25 to the actuators 12. The graph 31 provides temporal variation 35 of the measured interval between a finger and the touch surface. The graph 32 provides temporal variation 36 of the driving signal from the actuator driver circuit 25 to the actuators 12.

In the graph 31, the horizontal axis represents time and the vertical axis represents the interval measured by the interval detector 23 (the device output). In the graph 32, the horizontal axis represents time and the vertical axis represents the output from the actuator driver circuit 25. It is assumed that the actuators 12 are piezoelectric actuators and they vibrate at the same frequency as the output from the actuator driver circuit 25.

As illustrated in the graph 31, a finger approaches the touch surface from a distance and the value measured by the interval detector 23 reaches a predetermined first threshold at a time T1. As illustrated in the graph 32, the main controller 21 makes the actuator driver circuit 25 start outputting a driving signal in response to the measured interval reduced to the first threshold. As a result, the actuators 12 start vibrating and further, the touch surface of the touch input panel 10 starts vibrating together. As understood from this description, the touch surface starts vibrating after the measured interval decreases to the first threshold.

The interval detector 23 outputs a signal in accordance with the interval between the touch surface of the touch input panel 10 and the user's finger. The main controller 21 controls the actuator driver circuit 25 to start vibrating the actuators 12 when the signal (measured interval) from the interval detector 23 decreases to the first threshold, so that the touch surface of the touch input panel 10 vibrates in a specific frequency band.

At a time T2 later than the time T1, the measured interval between the finger and the touch surface reaches a second threshold. The second threshold is a predetermined value larger than the first threshold. Before reaching the second threshold at the time T2, the measured interval is always smaller than the second threshold. In response to the measured interval reaching the second threshold, the main controller 21 makes the actuator driver circuit 25 stop outputting the driving signal as illustrated in the graph 32. As a result, the actuators 12 stop vibrating and further, the touch surface of the touch input panel 10 stops vibrating together. As understood from this description, the touch surface stops vibrating after the measured interval increases to the second threshold.

The touch input panel 10 is vibrated at a frequency at which a squeeze film is generated between the finger and the touch surface and touch operation (input operation) with the finger works without a direct touch on the touch surface. The vibration frequency of the touch input panel 10 can be included in a frequency band from 10 kHz to 150 kHz or from 15 kHz to 100 kHz. The first threshold and the second threshold are determined appropriately for the configuration of the input device. For example, the first threshold can be in a range from 5 cm to 10 cm and the second threshold can be 1.5 times to twice as large as the first threshold.

As described above, the vibration of the actuator 12 is maintained from the time the measured interval has decreased to the first threshold until it increases to the second threshold. This configuration effectively prevents or reduces direct touches of a finger to the touch surface during the touch operation with the finger.

As described above, this example does not vibrate the actuators 12 until the measured interval decreases to the first threshold and starts vibrating the actuators 12 when the measured interval reaches the first threshold. Furthermore, this example stops vibrating the actuators 12 when the measured interval reaches the second threshold.

Maintaining vibration while the finger is close to the touch surface effectively prevents or reduces direct touches of a finger to the touch surface. Stopping the vibration when the measured interval indicates that the finger is sufficiently distant from the touch surface and touch operation is not intended reduces the power consumption and the possibility of failure.

As described above, the second threshold as a condition to stop vibration is larger than the first threshold. The user may move the finger up and down (away from and closer to the touch surface) during the touch operation. Determining the second threshold to stop vibration to be larger than the first threshold to start vibration can prevent the vibration of the actuators 12 from being frequently started/stopped during the user's touch operation. The second threshold can be equal to the first threshold.

The foregoing example stops vibrating the actuators 12 based on the measured interval. Another example can stop vibrating the actuators 12 based on the time elapsed since the last operation, instead of or in addition to the measured interval.

The main controller 21 counts the time elapsed since the last user's operation to the touch input panel 10. When the elapsed time reaches a predetermined time threshold, the main controller 21 stops vibrating the actuator 12. This configuration of stopping the vibration based on the time elapsed since the last operation to the touch input panel 10 can stop the vibration when the user's operation is finished and there is a small possibility that a finger will touch the touch surface. As a result, the power consumption and the possibility of failure can be reduced.

The touch detector circuit 27 has a function to detect a touch (touch-on) of a pointer (such as a finger) to the touch input panel and leaving (touch-off) of the pointer from the touch input panel and therefore, the time elapsed since detection of the pointer leaving can be used as the aforementioned time elapsed since the last operation.

For example, the main controller 21 stops vibrating the actuators 12 at least either when the measured interval reaches the second threshold or when the time elapsed since the last operation reaches a time threshold. In another example, the main controller 21 stops vibrating the actuators 12 when the measured interval is the second threshold or more and the elapsed time is the time threshold or more.

In the example illustrated in FIG. 3, the amplitude and the frequency of the output from the actuator driver circuit 25 are fixed. As described above, the levitation force from a squeeze film increases with decrease of the interval between a finger and the touch surface. Accordingly, this configuration effectively prevents or reduces direct touches of a finger to the touch surface. In another example, either one or both of the frequency and the amplitude of vibration can be varied in the vibration period from the time T1 to the time T2.

Next, an example of the method of driving the actuators 12 is described. The output signal from the actuator driver circuit 25 in the example illustrated in FIG. 3 can be a single-frequency sine wave. When the actuators 12 vibrate at a single specific frequency, the touch surface vibrates in a vibration mode (resonant mode) in accordance with the vibration of the actuators 12.

Figure 4A:
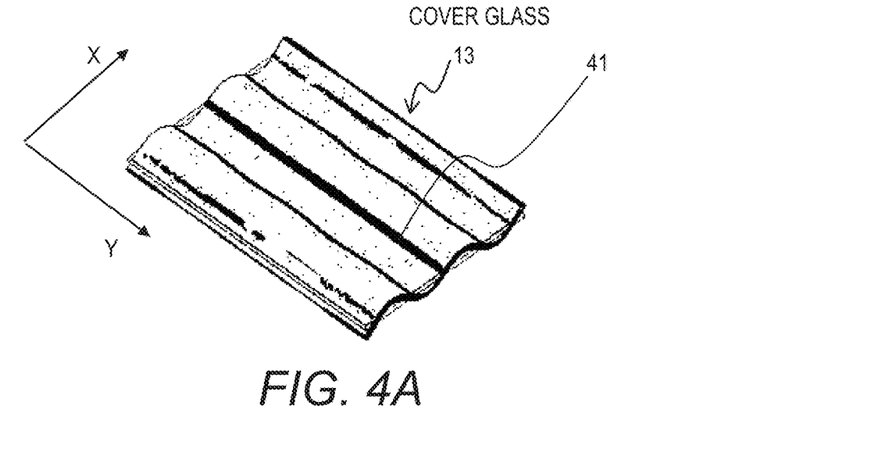
FIG. 4A schematically illustrates a resonant mode of a cover glass.
Figure 4B:
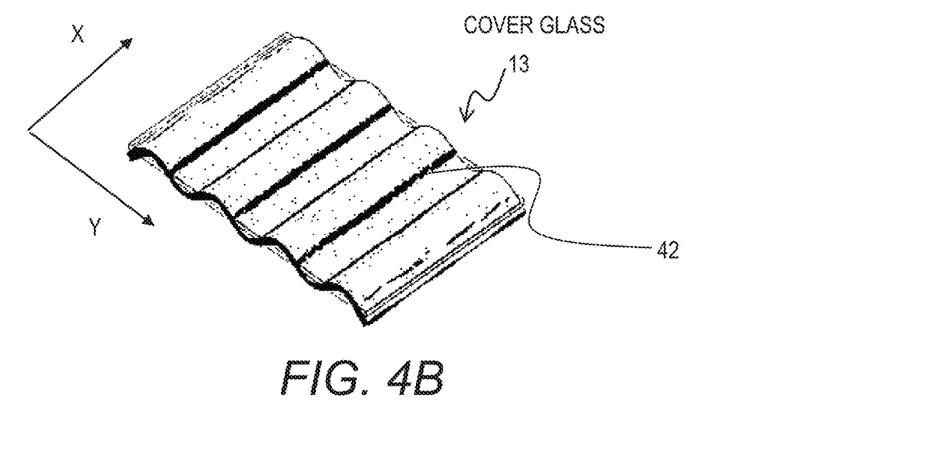
FIG. 4B schematically illustrates another resonant mode of the cover glass.
Figure 4C:
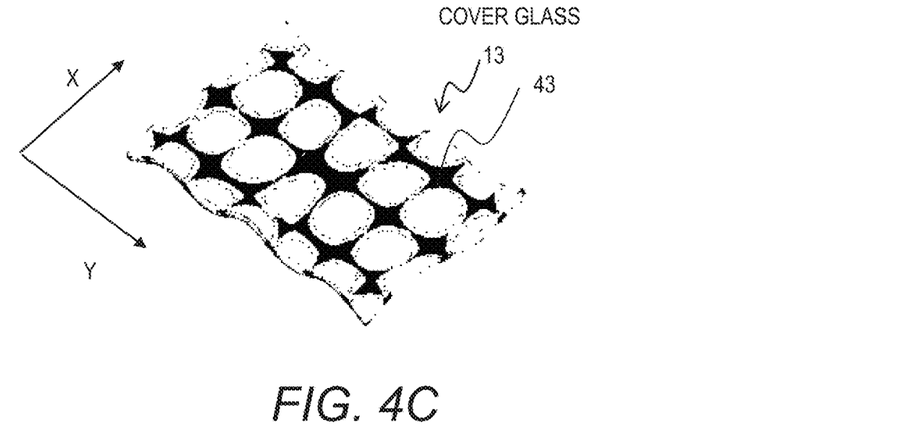
FIG. 4C schematically illustrates still another resonant mode of the cover glass.

FIGS. 4A to 4C schematically illustrate different resonant modes of the cover glass 13. FIG. 4A schematically illustrates the displacement in a resonant mode at 15.7 kHz; FIG. 4B schematically illustrates the displacement in a resonant mode at 19.4 kHz; and FIG. 4C schematically illustrates the displacement in a resonant mode at 17.8 kHz. In each resonant mode, a standing wave is generated on the cover glass 13 and their nodes and antinodes occur at specific locations within the plane.

In FIG. 4A, black lines represent the nodes of the standing wave. One of the nodes is provided with a reference sign 41 in FIG. 4A. Each node 41 extends in the Y-axis direction. The nodes 41 appear at regular intervals in the X-axis direction only. The X-axis and the Y-axis are perpendicular to each other within the plane of the touch surface.

In FIG. 4B, black lines represent the nodes of the standing wave. One of the nodes is provided with a reference sign 42 in FIG. 4B. Each node 42 extends in the X-axis direction. The nodes 42 appear at regular intervals in the Y-axis direction only. In FIG. 4C, black regions represent the nodes of the standing wave. In FIG. 4C, grid-like nodes occur.

The parts corresponding to the nodes in the vibrating cover glass 13 do not displace in the direction normal to the touch surface (principal surface). Accordingly, no squeeze film is generated above the nodes; the levitation force for the finger there could be too small to be sufficient for touchless operation.

Frequency Control

The main controller 21 in an embodiment of this specification vibrates the touch surface with a plurality of frequencies (resonant modes). In the following, two methods to vibrate the touch surface with a plurality of frequencies (resonant modes) are described.

The first method drives the actuators 12 with superimposed multiple frequencies. In accordance with the vibration of the actuators 12 in a state where vibrations at different frequencies are superimposed together, the touch surface vibrates in a state where multiple resonant modes are superimposed together. This configuration reduces node areas from the touch surface.

The second method drives the actuators 12 at multiple frequencies by time division. In other words, this method vibrates the actuators 12 at different frequencies cyclically. In accordance with the vibration of the actuators 12, the touch surface cyclically changes its resonant mode. As a result, the finger is provided with an appropriate levitation force in one of the resonant modes.

Figure 5:
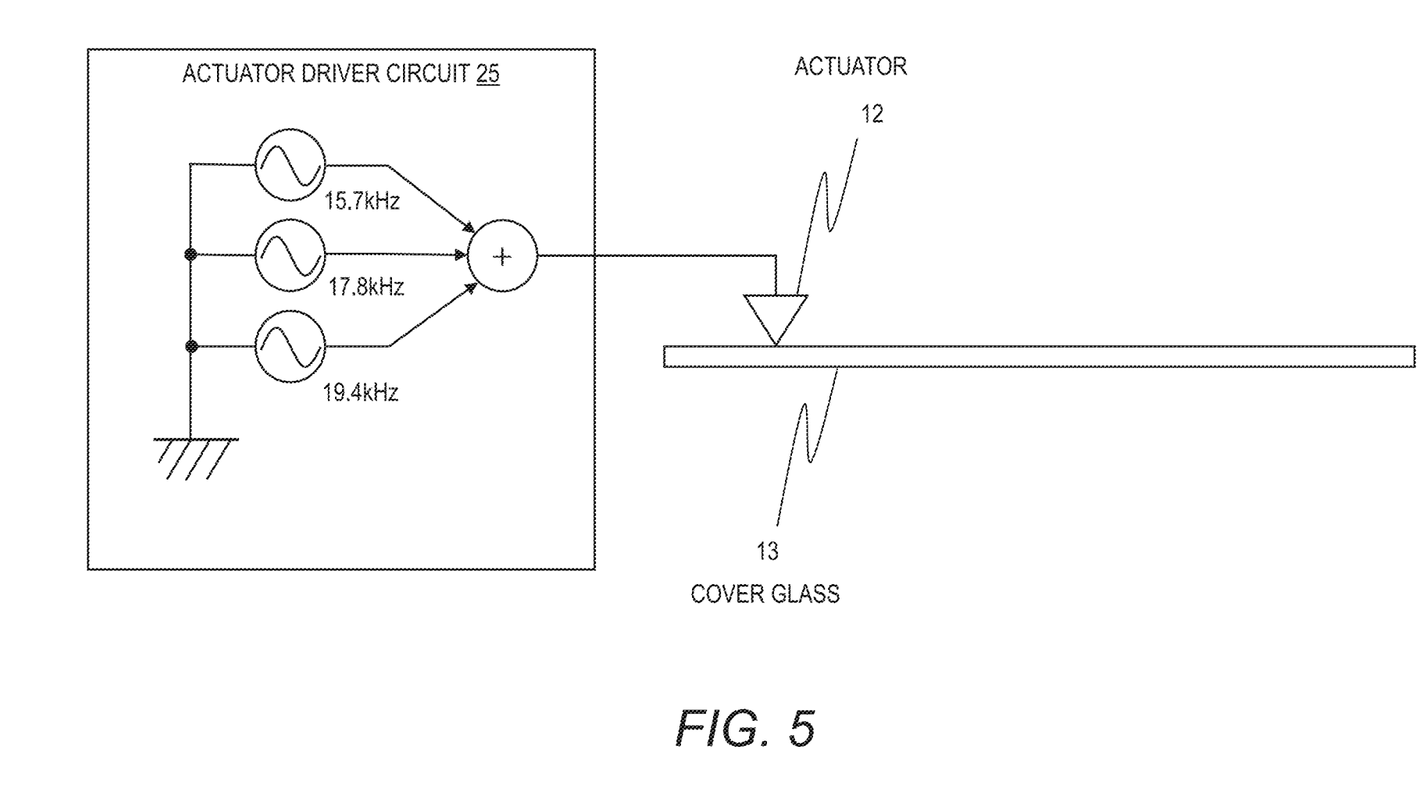
FIG. 5 illustrates an example of supplying an actuator with a driving signal with three different frequencies superimposed together.

An example of superimposition driving (the first method) is described. FIG. 5 illustrates an example of supplying an actuator 12 with a driving signal of three different frequencies superimposed together. The actuator driver circuit 25 superimposes a 15.7 kHz signal, a 17.8 kHz signal, and a 19.4 kHz signal together to generate an output driving signal and supplies the output driving signal to the actuator 12. The actuator 12 vibrates similarly to the supplied driving signal.

In the case where the actuator driver circuit 25 generates an output driving signal by superimposing two signals of the 15.7 kHz signal and the 19.4 kHz signal together and supplies the output driving signal to the actuators 12, the displacement occurring to the cover glass is such that the displacement to occur in the cover glass when the actuators 12 are driven with only the 15.7 kHz signal is added to the displacement to occur in the cover glass when the actuators 12 are driven with only the 19.4 kHz signal.

Accordingly, in the case where the actuator driver circuit 25 generates an output driving signal by superimposing two signals of a 15.7 kHz signal and a 19.4 kHz signal together and supplies the output signal to the actuators 12, the displacement of the cover glass at the location of a node when the actuators 12 are driven with only the 15.7 kHz signal is equal to the displacement when the actuators 12 are driven with only the 19.4 kHz signal.

In view of this result, in the case where the actuator driver circuit 25 generates an output driving signal by superimposing two signals of a 15.7 kHz signal and a 19.4 kHz signal together and supplies the output signal to the actuators 12, the locations where displacement does not occur or the locations to be a node are expressed by the logical AND of the diagram representing the nodes when the actuators 12 are driven with only the 15.7 kHz signal and the diagram representing the nodes when the actuators 12 are driven with only the 19.4 kHz.

In other words, in the case where the actuator driver circuit 25 generates an output driving signal by superimposing two signals of a 15.7 kHz signal and a 19.4 kHz signal together and supplies the output signal to the actuators 12, the location where displacement still does not occur or the locations remaining as nodes are the grid points where the nodes in FIG. 4A and the nodes in FIG. 4B diagrammatically intersect.

If the actuator driver circuit 25 drives the actuators 12 with a driving signal with another 17.8 kHz signal superimposed on the foregoing output driving signal, the nodes occurring at the grid points where the nodes in FIGS. 4A and 4B diagrammatically intersect become no longer nodes because of the superposition principle of waves, so that the cover glass can be displaced in the normal direction. Through the Inventors' experiments, it was revealed that the entire cover glass can be displaced in the normal direction and provides a finger with a sufficient levitation force for touchless operation by supplying the actuators 12 with an output driving signal generated by superimposing a 15.7 kHz signal, a 17.8 kHz signal, and a 19.4 kHz signal together as described above.

As described with reference to FIGS. 4A to 4C, the resonant modes at the foregoing three frequencies exhibit different node layouts. Accordingly, vibration at superimposed these three frequencies can effectively reduce the node areas from the touch surface.

As described above, the nodes in the resonant mode at 15.7 kHz occur at regular intervals in the X-axis direction (the first direction) only and the nodes in the resonant mode at 19.4 kHz occurs at regular intervals in the Y-axis direction (the second direction) only. The nodes in the resonant mode at 17.8 kHz occurs at regular intervals in both the X-axis direction and the Y-axis direction. The combination of such three resonant modes effectively reduces the area of nodes.

The number of frequencies to be superimposed and their values can be determined appropriately for the configuration of the input device. The number of frequencies to be superimposed can be four or more and the node layouts in the different resonant modes are not also limited to specific ones. The frequencies to be superimposed can be preset to the main controller 21 or the actuator driver circuit 25. The actuator driver circuit 25 can output a driving signal of superimposed multiple frequencies in response to an instruction from the main controller 21 to start vibration or the main controller 21 can specify the frequencies to be superimposed in the instruction for the actuator driver circuit 25.

Next, an example of time division driving (the second method) is described. The actuator driver circuit 25 changes the frequency of the driving signal cyclically, for example, at every 1 millisecond. The actuator driver circuit 25 serially and cyclically outputs driving signals of predetermined different frequencies. Assume that three frequencies of 15.7 kHz, 17.8 kHz, and 19.4 kHz are preset. The actuator driver circuit 25 selects the frequencies for the output driving signal in the order of 15.7 kHz, 17.8 kHz, and 19.4 kHz. The actuator driver circuit 25 selects 15.7 kHz next to 19.4 kHz.

The number of frequencies for the signals to be serially output and their values are determined appropriately for the configuration of the input device. The frequencies for the signals to be serially output can be preset to the main controller 21 or the actuator driver circuit 25. The actuator driver circuit 25 can cyclically output driving signals of different frequencies in response to an instruction from the main controller 21 to start vibration or the main controller 21 can specify the frequency for the driving signal to be output next in the instruction for the actuator driver circuit 25.

Amplitude Control

Next, an example of a driving method that varies the driving voltage (amplitude of vibration) for the actuators 12 with time to generate a squeeze film is described. This driving method more appropriately provides a necessary levitation force to a finger while attaining low power consumption and a small possibility of failure.

When a finger approaches the touch surface, the main controller 21 starts vibrating the actuators 12 having been still. Thereafter, as the measured interval between the touch surface and the finger decreases further, the main controller 21 increases the output voltage from the actuator driver circuit 25 or the amplitude of vibration of the actuators 12. Inversely, as the measured interval between the touch surface and the finger increases, the main controller 21 reduces the output voltage from the actuator driver circuit 25.

Figure 6:
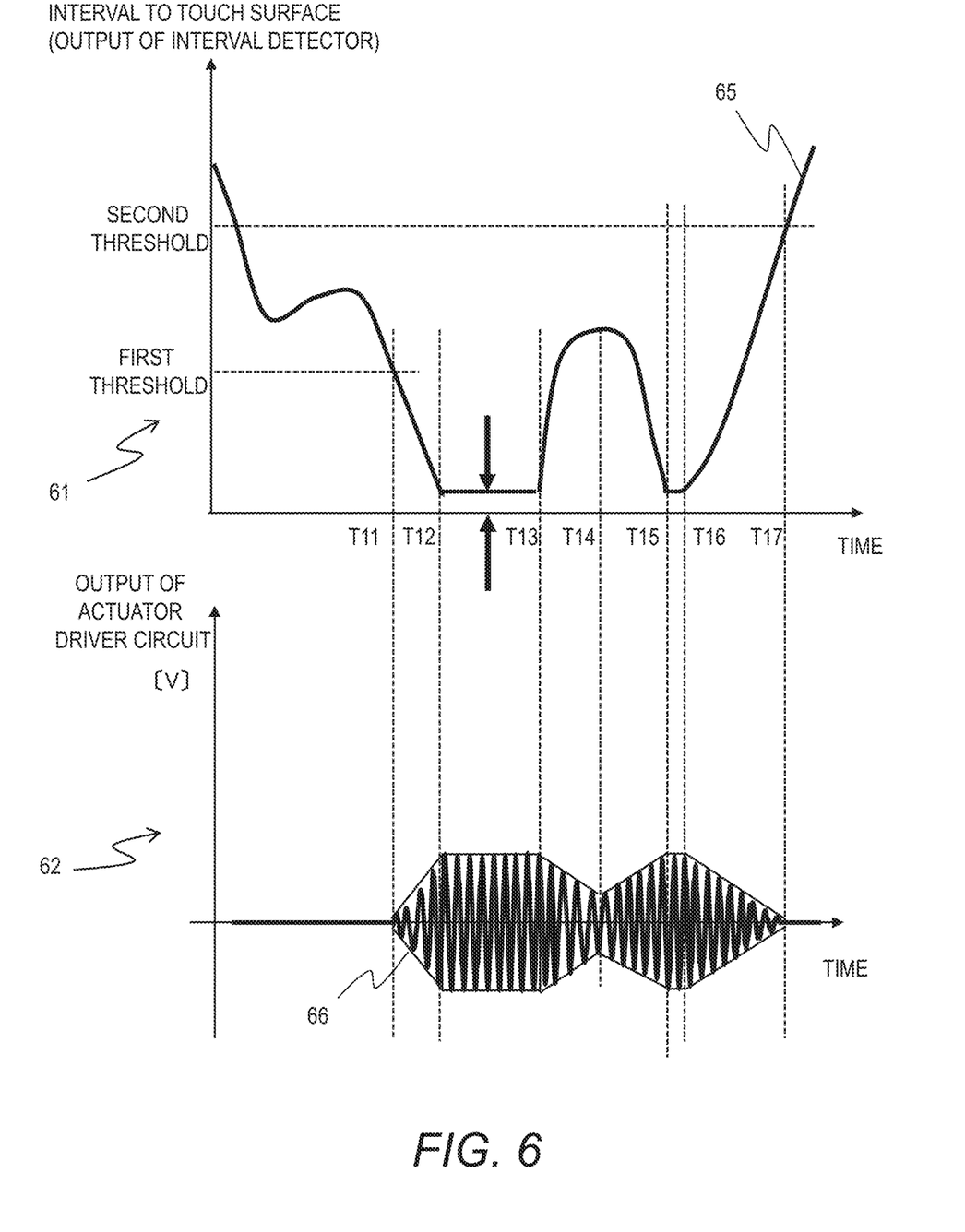
FIG. 6 schematically illustrates temporal variation of the interval between a finger and a touch surface measured by an interval detector and temporal variation of the driving signal from an actuator driver circuit to actuators.

FIG. 6 schematically illustrates temporal variation of the interval between a finger and the touch surface measured by the interval detector 23 and temporal variation of the driving signal from the actuator driver circuit 25 to the actuators 12. The graph 61 provides temporal variation 65 of the measured interval between a finger and the touch surface. The graph 62 provides temporal variation 66 of the driving signal from the actuator driver circuit 25 to the actuators 12.

In the graph 61, the horizontal axis represents time and the vertical axis represents the interval measured by the interval detector 23 (the device output). The first threshold and the second threshold can be the same as those in the example described with reference to FIG. 3. In the graph 62, the horizontal axis represents time and the vertical axis represents the output from the actuator driver circuit 25.

As illustrated in the graph 61, a finger approaches the touch surface from a distance and the value measured by the interval detector 23 reaches a predetermined first threshold at a time T11. As illustrated in the graph 62, the main controller 21 makes the actuator driver circuit 25 start outputting a driving signal in response to the measured interval reduced to the first threshold. As a result, the actuators 12 start vibrating and further, the touch surface of the touch input panel 10 starts vibrating together.

The measured interval between the finger and the touch surface decreases from the time T11 to a time T12 as illustrated in the graph 61. The main controller 21 increases the voltage of the driving signal in response to the decrease in measured interval as illustrated in the graph 62. The measured interval is unchanged from the time T12 to a time T13 as illustrated in the graph 61. During this period, the finger receives a resistance because of the squeeze film pressure or acoustic radiation pressure and levitates in the air slightly above the touch surface. The driving signal voltage is constant from the time T12 to the time T13 as illustrated in the graph 62.

The measured interval between the finger and the touch surface increases from the time T13 and a time T14 as illustrated in the graph 61. The main controller 21 reduces the voltage of the driving signal in response to the increase in the measured interval as illustrated in the graph 62.

The measured interval between the finger and the touch surface decreases from the time T14 to a time T15 as illustrated in the graph 61. The main controller 21 increases the voltage of the driving signal in response to the decrease in measured interval as illustrated in the graph 62. The measured interval is unchanged from the time T15 to a time T16 as illustrated in the graph 61. The driving signal voltage is constant from the time T15 to the time T16 as illustrated in the graph 62.

The measured interval between the finger and the touch surface increases from the time T16 and a time T17 as illustrated in the graph 61. The main controller 21 reduces the voltage of the driving signal in response to the increase in the measured interval as illustrated in the graph 62.

The measured interval reaches the second threshold at the time T17 and thereafter, increases further as illustrated in the graph 61. The main controller 21 stops outputting the driving signal at the time T17 as illustrated in the graph 62. As a result, the actuators 12 stop vibrating and further, the touch surface of the touch input panel 10 stops vibrating together.

The above-described amplitude control can be combined with either of the foregoing frequency control methods. The main controller 21 controls the amplitude of vibration based on the measured interval and further, makes the actuator driver circuit 25 output a driving signal with multiple frequencies superimposed together or output driving signals of different frequencies cyclically to the actuators 12. The driving signal can be a single-frequency signal.

The increase rate and the decrease rate for the amplitude for a measured interval can be different and they can be fixed rates or variable rates.

Other Control Methods

Hereinafter, other methods of controlling the input device are described. The main controller 21 in an embodiment of this specification infers a touch point of a finger to operate the input device and determines the driving signal for the actuators 12 based on the inferred location. Specifically, the main controller 21 selects a single frequency or a plurality of frequencies to be superimposed for the driving signal. More specifically, the main controller 21 selects one or more frequencies so that the inferred touch point will not overlap the nodes in the vibration mode of the touch surface. This configuration reduces the possibility that the finger will directly touch the touch surface to operate the input device.

The interval detector 23 can detect the location of a finger within the touch surface, in addition to the interval between the finger and the touch surface. As described above, any existing technique to locate an in-plane point can be employed.

For example, the main controller 21 has control information for different vibration modes. The control information for one vibration mode includes information on one or more frequencies for a driving signal to generate the vibration mode and the node areas in the vibration mode. The main controller 21 acquires not only information on the interval between a finger and the touch surface but also information on the location of the finger in the touch surface from the interval detector 23. For example, the main controller 21 can infer that an in-plane location of a finger at the time when the interval between the touch surface and the finger reaches a predetermined threshold is a touch point. The touch point is a location where operation of touch input with a finger is performed.

The main controller 21 compares the node areas of each vibration mode defined in the control information with the inferred touch point and selects a vibration mode whose node areas do not include the inferred touch point. The main controller 21 determines the one or more frequencies associated with the selected vibration mode to be the one or more frequencies to generate an actuator driving signal.

The input device in an embodiment of this specification displays image objects to be touched for operation on the display 15 at the locations outside the node areas of the vibration mode. Since the frequency for the driving signal to vibrate the actuators 12 is predetermined, the node areas of the touch surface in the vibration mode are also known in advance.

Figure 7:
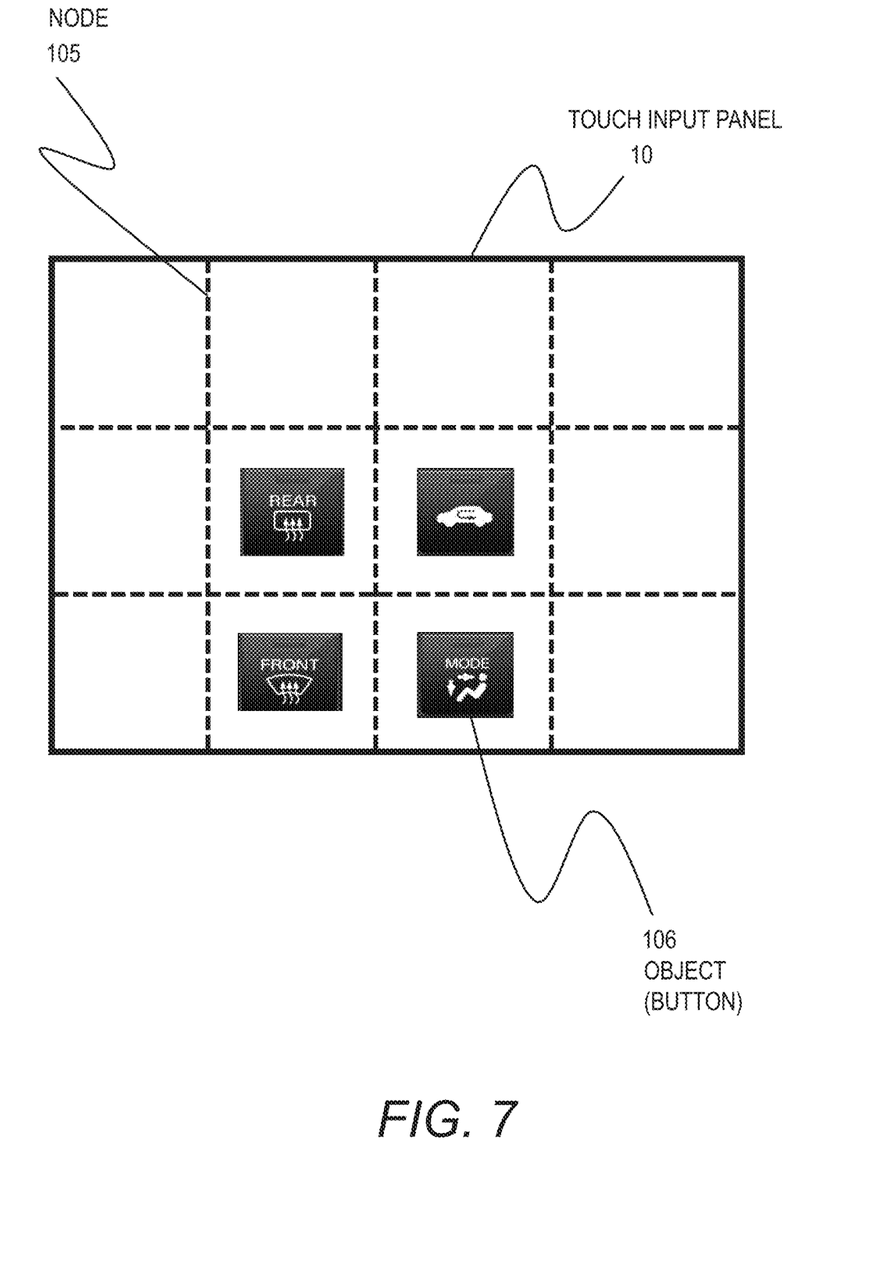
FIG. 7 illustrates an example where image objects are displayed at locations that do not overlap a node on a touch surface.

FIG. 7 illustrates an example where objects to be touched for operation are displayed outside the node areas of the vibration mode. The touch input panel 10 has nodes (also referred to as node area) 105 indicated by dashed lines. In the example of FIG. 7, grid-like nodes appear on the touch input panel 10. The display 15 displays objects 106 to be operated by a user so that the objects do not overlap the nodes of vibration of the touch input panel 10. In FIG. 7, one of the four objects is provided with a reference sign 106 by way of example.

The main controller 21 supplies image data to the display 15. The image according to the image data includes one or more objects to be touched for operation. Each object is displayed in an area that does not overlap the predefined node area (an area outside the node area). Since each object is located in an area that does not overlap the node area, the touch input panel 10 can effectively provide a levitation force to a finger approaching to touch an object.

Ozone Generator

Hereinafter, an example of a touch input panel that generates ozone is described. Ozone can sterilize the touch surface. When the touch surface is contaminated, sterilizing the touch surface with ozone can prevent contagious diseases from spreading.

Figure 8:
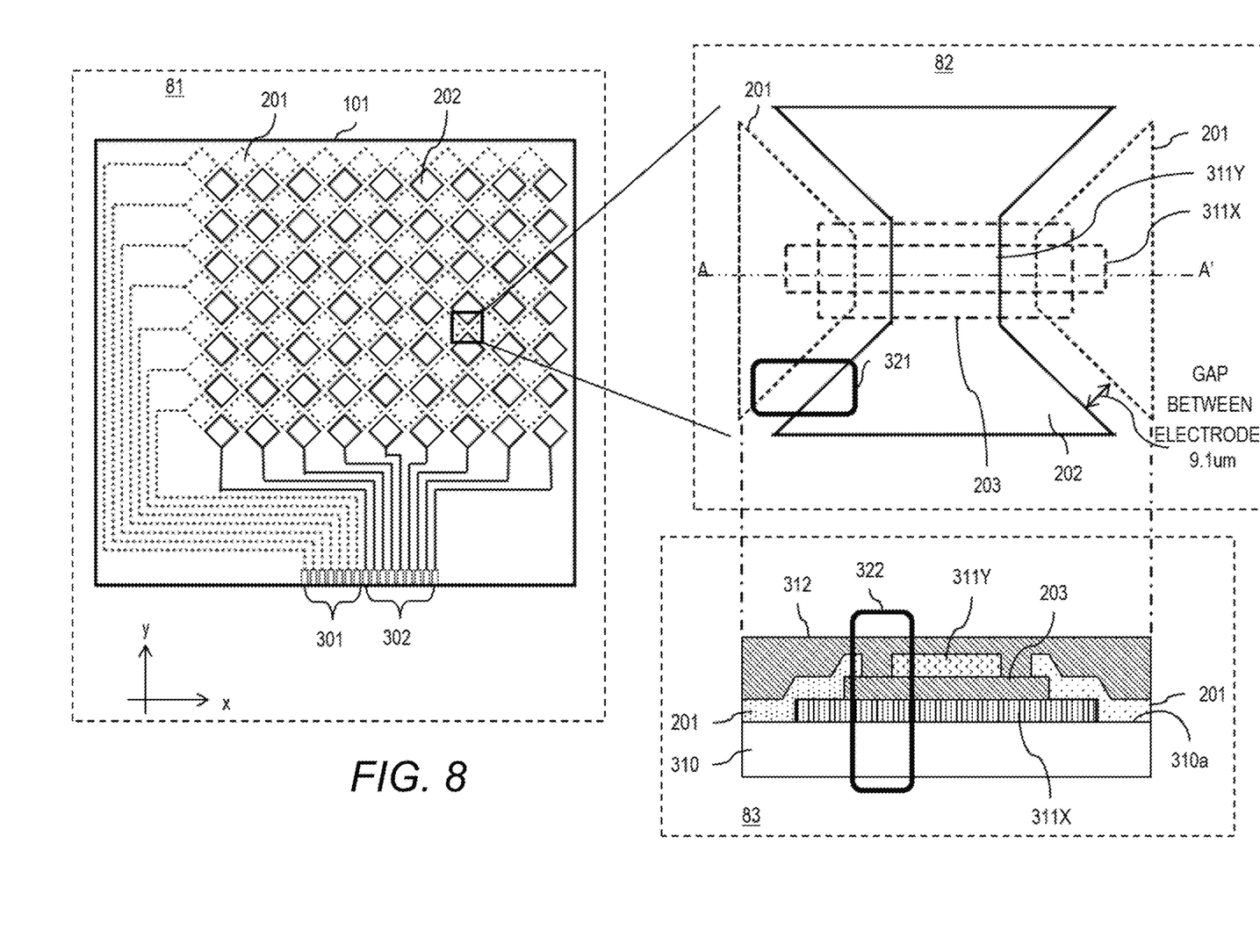
FIG. 8 illustrates a configuration example of a touch input panel.

FIG. 8 illustrates a configuration example of a touch input panel 10. The section 81 is a plan diagram of an electrode board 101 of the touch input panel 10; the section 82 is a partial enlarged diagram of the plan diagram 81; and the section 83 is an A-A' cross-sectional diagram of the partial enlarged diagram 82. The electrode board 101 includes X electrodes 201, Y electrodes 202, and insulating films 203 above a transparent support substrate 310.

In the sections 81 and 82, the X electrodes 201 and the lines therefor are denoted by dotted lines and the Y electrodes 202 and the lines therefor are denoted by solid lines. The X electrodes and the Y electrodes are transparent electrodes; they can be made of indium tin oxide (ITO), for example. These X electrodes 201 and Y electrodes 202 can have quadrangular planar shapes.

The touch detector circuit 27 applies a predetermined voltage across the X electrodes 201 and the Y electrodes 202 to drive the electrode board 101 as an ozone generator. In response to the application of voltage, ozone is generated on the surface of the electrode board 101 to sterilize the surface 101a of the electrode board 101.

The main controller 21 controls the application of voltage by the touch detector circuit 27. Specifically, the main controller 21 instructs the touch detector circuit 27 to apply voltage to the electrode board 101 or stop the application of voltage to the electrode board 101 in response to an external input such as a signal from a sensor (not shown) or an operation by a user.

The electrode board 101 is described in more detail. In the section 81, the lines for the X electrodes 201 and the lines for the Y electrodes 202 are connected with terminals 301 and 302, respectively. The terminals 301 and 302 are connected with the touch detector circuit 27.

The X electrodes 201 and the Y electrodes 202 can have quadrangular (rhombic or rectangular) shapes. A plurality of X electrodes 201 are connected by bridge electrodes 311X as first connection members (see the section 82) into a string extending in the x-direction. That is to say, a plurality of X electrodes 201 are aligned in the x-direction. These X electrodes electrically connected in the x-direction are referred to as an X-electrode set. The X-electrode sets connected in strings in the x-direction are disposed at 2-mm intervals in the y-direction, for example. Each X-electrode set extends in parallel in the y-direction to the other X-electrode sets.

A plurality of Y electrodes 202 are connected by bridge electrodes 311Y as second connection members (see the section 82) into a string extending in the y-direction. That is to say, a plurality of Y electrodes 202 are aligned in the y-direction. These Y electrodes electrically connected in the y-direction are referred to as a Y-electrode set. The Y-electrode sets connected in strings in the y-direction are disposed at 2-mm intervals in the x-direction, for example. Each Y-electrode set extends in parallel in the x-direction to the other Y-electrode sets.

The X-electrode sets and the Y-electrode sets are fabricated in such a manner that each first connection member (bridge electrode 311X) overlaps a second connection member (bridge electrode 311Y) with an insulating film 203 interposed therebetween when viewed planarly. As illustrated in the section 83, a bridge electrode 311X and a bridge electrode 311Y are isolated from each other by an insulating film 203. In other words, an X-electrode set and a Y-electrode set cross each other in three dimensions with an insulating film 203 interposed therebetween. The X electrodes 201 and the Y electrodes 202 are fabricated in such a manner that they do not overlap when viewed planarly. In other words, each X electrode 201 is adjacent to Y electrodes 202 when viewed planarly.

Next, a manufacturing method is described using the section 83. The support substrate 310 is a transparent insulating substrate such as a glass substrate. First, the method produces bridge electrodes 311X, which are films of a transparent conductor such as ITO, on the first surface 310a of the support substrate 310. Next, the method produces insulating films 203, which can be films of silicon nitride (SiN), above the bridge electrodes 311X.

Each insulating film 203 is formed so that the insulating film 203 covers a part of a bridge electrode 311X to isolate the bridge electrode 311X from a Y electrode 202 and a bridge electrode 311Y but does not cover another part of the bridge electrode 311X to let the bridge electrode 311X contact the X electrode 201. Next, the method produces X electrodes 201, Y electrodes 202, bridge electrodes 311Y, lines, and terminals 301 and 302 together. These are transparent conductive films. Last of all, the method produces an insulating film 312, which can be a SiN film, and opens contact holes in the terminals 301 and 302.

Application of a voltage across the terminals 301 and 302 on the electrode board 101 fabricated as described above generates electric fields between X-electrode sets and Y-electrode sets. When the intensity of the generated electric fields exceeds the air breakdown level, ozone is generated by electric discharge. The locations on the insulating film 312 where ozone is generated can be single-layer areas between electrodes such as an area 321 between an X electrode 201 and a Y electrode 202 and multi-layered areas between electrodes such as an area 322 between a bridge electrode 311X and a bridge electrode 311Y with an insulating film 203 therebetween.

Figure 9A:
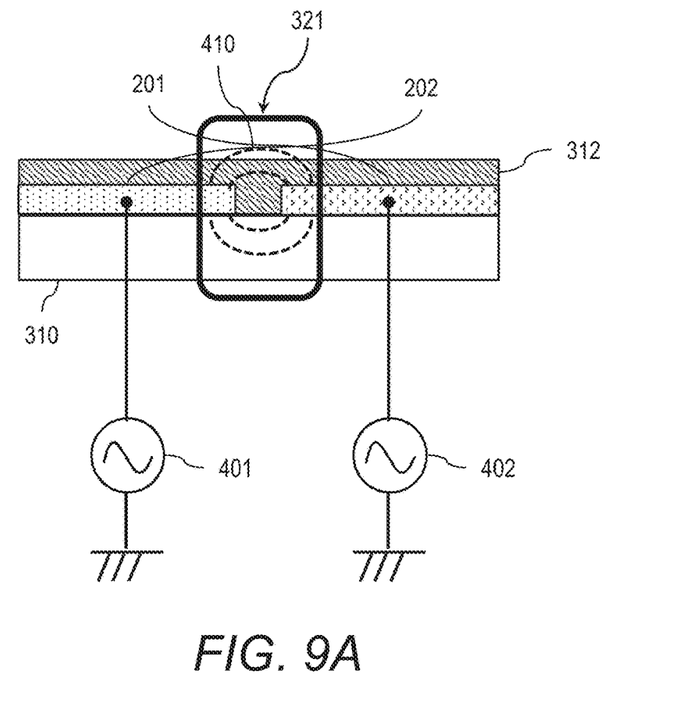
FIG. 9A is an explanatory diagram illustrating a principle of generation of ozone.
Figure 9B:
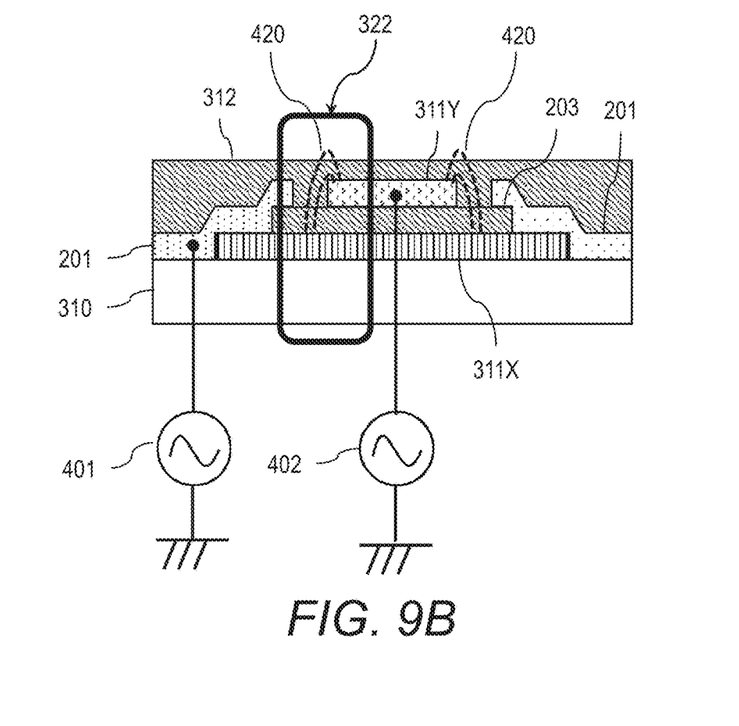
FIG. 9B is an explanatory diagram illustrating another principle of generation of ozone.

FIGS. 9A and 9B are explanatory diagrams illustrating principles of generation of ozone. FIG. 9A illustrates the principle of generation of ozone in an electric field generation area 321 of a single-layer area between electrodes in the section 82 and FIG. 9B illustrates the principle of generation of ozone in an electric field generation area 322 of a multi-layered area between electrodes in the section 83. The signal source 401 is an alternating-current source to apply a voltage to the X electrode 201 and the signal source 402 is an alternating-current source to apply a voltage to the Y electrode 202.

Assume that the output from the signal source 401 is GND and the output from the signal source 402 is a predetermined alternating voltage. In this case, an electric field 410 is generated in the single-layer area between electrodes in FIG. 9A because of the potential difference between the X electrode 201 and the Y electrode 202 and an electric field 420 is generated in the multi-layered area between electrodes in FIG. 9B because of the potential difference between the bridge electrode 311X and the bridge electrode 311Y. When the intensities of the electric fields 410 and 420 in the air above the insulating film 312 reach a predetermined value, air breakdown happens. The air breakdown induces silent discharge that generates ozone.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A device to enable touchless operation of an instrument, the device comprising:
   an actuator configured to vibrate the instrument;
   a controller configured to control the actuator; and
   an interval detector configured to detect an interval between the instrument and an object to operate the instrument,
   wherein the controller is configured to:
      start vibrating the actuator having been still after the interval detected by the interval detector reaches a first threshold;
      keep vibrating the actuator until the interval detected by the interval detector reaches a second threshold after the interval reaches the first threshold; and
      stop vibrating the actuator after the interval detected by the interval detector reaches the second threshold.

2. The device according to claim 1, wherein the controller is configured to vibrate the actuator within a frequency band from 10 kHz to 150 kHz.

3. The device according to claim 1,
   wherein the instrument is a touch input panel, and
   wherein the controller is configured to drive the actuator in such a way that the actuator vibrates in a state where a plurality of frequencies are superimposed together.

4. The device according to claim 3, wherein a touch surface of the touch input panel vibrates in a state where a resonant mode in which nodes occur only in a first direction within a touch surface of the touch input panel, a resonant mode in which nodes occur only in a second direction perpendicular to the first direction within the touch surface, and a resonant mode in which nodes occur in both the first direction and the second direction within the touch surface are superimposed together in response to vibration of the actuator.

5. The device according to claim 1, wherein the controller is configured to vibrate the actuator at different frequencies cyclically.

6. The device according to claim 5,
   wherein the instrument is a touch input panel, and
   wherein a touch surface of the touch input panel vibrates in one of a resonant mode in which nodes occur only in a first direction within a touch surface of the touch input panel, a resonant mode in which nodes occur only in a second direction perpendicular to the first direction within the touch surface, and a resonant mode in which nodes occur in both the first direction and the second direction within the touch surface in accordance with vibration of the actuator.

7. The device according to claim 1, wherein the controller is configured to increase an amplitude of vibration of the actuator as the object approaches the instrument and decrease the amplitude of vibration of the actuator as the object gets away from the instrument.

8. The device according to claim 1, wherein the controller is configured to stop vibrating the actuator in a case where an interval detected by the interval detector is the second threshold or more and a time elapsed since the last operation to the instrument is the time threshold or more.

9. The device according to claim 1,
   wherein the instrument is a touch input panel, and
   wherein the controller is configured to:
      detect a location of the object within a touch surface of the touch input panel;
      infer a touch point of the object based on the detected location; and
      drive the actuator with a driving signal with which the inferred touch point is located outside nodes of vibration of the touch surface.

10. The device according to claim 1, further comprising:
    a display configured to display an image;
    wherein the instrument is a touch input panel disposed in front of the display, and
    wherein the controller is configured to display image objects to be touched for operation on the display in areas outside nodes of vibration of the touch surface of the touch input panel.

11. The device according to claim 1, wherein the instrument is a touch input panel including elements configured to generate ozone.

* * * * *